US005980056A

United States Patent [19]

West

[11] Patent Number: 5,980,056

[45] Date of Patent: Nov. 9, 1999

[54] OUTDOOR LIGHTING FIXTURE PROVIDING AUDIO AND VISUAL EFFECTS

[76] Inventor: Mark West, 1388 Calle Violeta, Thousand Oaks, Calif. 91360

[21] Appl. No.: 08/919,970

[22] Filed: Aug. 28, 1997

[51] Int. Cl.$^{6}$ ...................................................... H04M 1/22

[52] U.S. Cl. ................................ 362/86; 362/253; 84/404

[58] Field of Search .............................. 362/253, 86, 404, 362/408; 84/402, 403, 404, 102

[56] References Cited

U.S. PATENT DOCUMENTS 4,854,214 8/1989 Lowe ...................................... 362/253

*Primary Examiner*—Sandra O'Shea
*Assistant Examiner*—Todd Reed Hopper
*Attorney, Agent, or Firm*—Lyon & Lyon LLP

[57] ABSTRACT

An outdoor lighting fixture for providing coordinated visual and audio effects which includes a first housing adapted to be carried by a ceiling support, an electric light source mounted in the housing for directing light downwardly therefrom and a plurality of chime members, preferably tubular in configuration, depending from the housing in a laterally spaced array within the area below the light source. Upon activation of the light source in a light breeze, the chime members will contact one another to provide the melodic audio effect of a wind chime while their movement below the light source creates a moving shadow effect on the floor below having a tempo corresponding to that of the melodic audio effect created by the contacting chime elements.

5 Claims, 1 Drawing Sheet

OUTDOOR LIGHTING FIXTURE PROVIDING AUDIO AND VISUAL EFFECTS

BACKGROUND OF THE INVENTION

The present invention relates to a lighting fixture for use out-of-doors which utilizes the wind to provide soothing and aesthetically pleasing audio and visual effects. Numerous types and configurations of lighting fixtures have previously been developed to provide a wide variety of visual effects. Typically such fixtures employ a light source, various types of electrical circuitry to effect intermittent illumination and/or some form of mechanical drive to effect movement of one or more objects relative to the light source to create the desired effects. Examples of such devices include strobe lights and lava lamps. Such devices are generally relatively expensive, not overly attractive and extremely repetitive in their visual effects.

The light fixture of the present invention combines a light source with a wind chime in a novel configuration to utilize the wind as the drive mechanism and the chimes as the moving objects and thus create a soothing visual effect which uniquely complements the tempo of the melodic sounds of the chimes. The coordinated audio and visual effects are attained without the need for any additional electrical circuitry or mechanical drive and thus at a minimal cost.

SUMMARY OF THE INVENTION

Briefly, the light fixture of the present invention is adapted to be suspended vertically in an outdoor location where it will encounter mild breezes. The fixture is comprised of a decorative outer housing disposed about an inner housing containing an electric light source. A plurality of chime elements, preferably tubular in configuration, are suspended from the inner housing below the light source so as to create a shadow on the floor below as the light source passes through and about the suspended chime elements. With a slight breeze, the chime elements will contact one another to provide the melodic audio effect of a wind chime. As the chime elements are moved about under the light source, they intermittently interrupt the path of light emanating from the light source. Such interruptions create a moving shadow effect on the floor below having a tempo corresponding to that of the melodic effect created by the contacting chime elements.

It is the principle object of the present invention to provide an outdoor lighting fixture which produces coordinated audio and visual effects which are both soothing and aesthetically pleasing at minimal costs.

Other objects and advantages of the present invention will become readily apparent from the following detailed description taken in conjunction with the accompanying drawings.

DESCRIPTION OF THE PREFERRED EMBODIMENTS IN THE DRAWINGS

Figure 1:
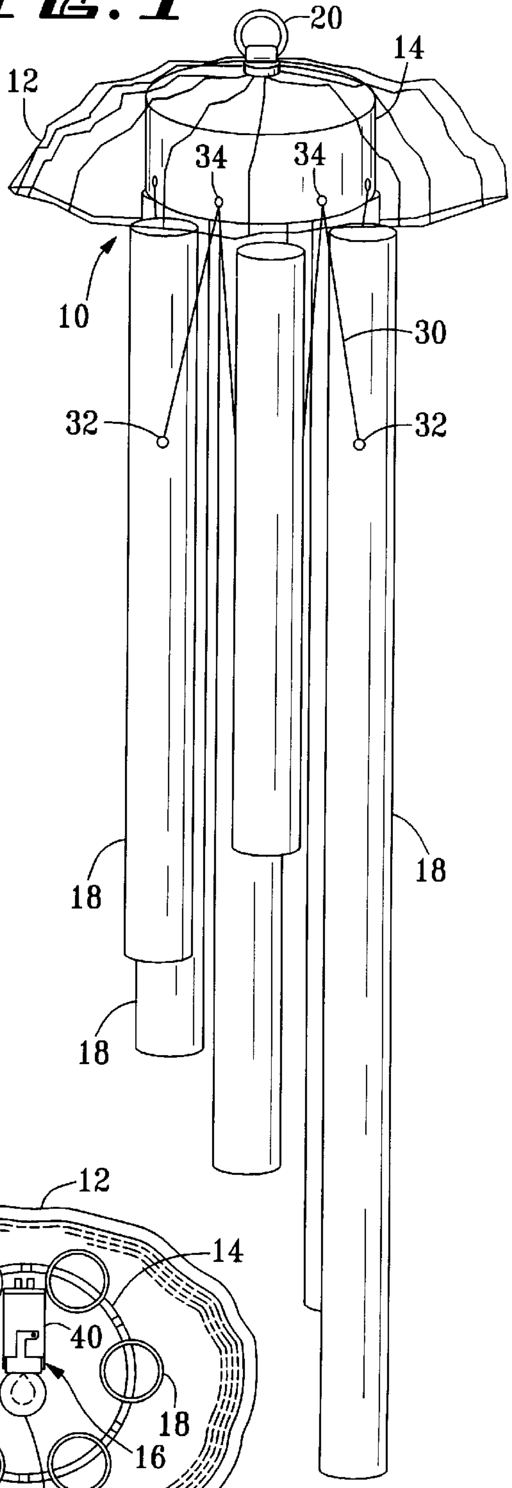
FIG. 1 is a perspective view of the light fixture of the present invention.

Referring now in detail to the drawings, the light fixture 10 of the present invention includes a decorative outer housing 12, an inner housing 14, a light source 16, a plurality of chime members 18 and a suspension bolt 20 for hanging the fixture from a ceiling (not shown). The outer housing 12 can be of any desired configuration and is employed primarily for decorative purposes. In the embodiment of the invention shown in the drawings, an abalone shell is used to define the outer housing 12. The inner housing 14, provides a reflective inner surface 22 for the light source 16 and carries the chime members 18. The suspension bolt 20 extends through aligned apertures in the outer and inner housings 12 and 14, is threadably engaged by a washer 24 disposed adjacent the interior inner surface 22 of inner housing 14 and defines a loop 26 at the upper end thereof for suspending the fixture from the ceiling by a decorative chain (not shown) or the like. The electric cord 28 which provides power for the light source 16 preferably extends through bolt 20 for electrical communication with the light source 16. In such an embodiment, the decorative outer housing 12 merely rests on and is supported by the upper surface of the inner housing 14.

Figure 2:
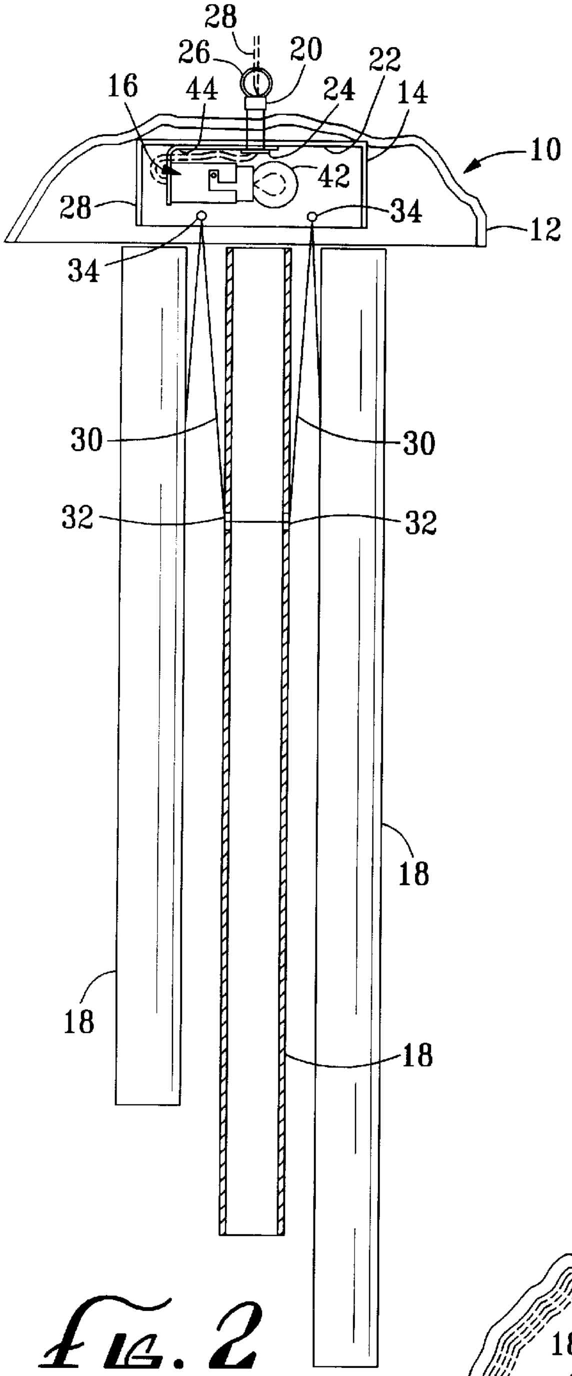
FIG. 2 is a sectional view of the fixture of the present invention taken along line 2—2 of FIG. 1.
Figure 3:
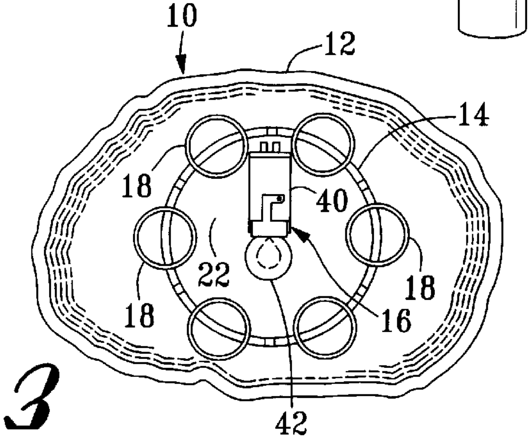
FIG. 3 is a sectional view of the fixture of the present invention taken along line 3—3 of FIG. 2.

The inner housing 14 is preferably of a cylindrical configuration so as to define an annular depending wall 28 from which the chime members 18 can be hung in a uniformly spaced array about and below the light source 16 and reflective inner surface 22 of housing 14 as seen in FIG. 2. This can be easily achieved by means of a cord 30 alternately extending through aligned pairs of apertures 32 in the chime members 18 and equidistantly spaced apertures 34 in the depending sidewall of inner housing 14. Other means for suspending the chime members 18 such that they would be moved against each other in a light breeze could, of course, also be employed.

The chime members 18 preferably employed in the present invention are defined by cylindrical hollow tubes, preferably constructed of metal, so as not only to provide the desired audio effects when driven together by a breeze, but also to allow the light from light source 16 to pass therethrough to the ground surface below. As a result, the effect of the movement of the tubes by a breeze not only creates an audio wind chime effect but the visual effect of moving shadows as the tubes are moved about below the light source. While other chime member configurations could be employed, the use of hollow tubes accentuates the shadow effect. As the shadow effect is created by the light shinning through and about the chime members 18, the rate of movement of the shadows will correspond to the rate of movement of the chime members 18 and thus correspond with the tempo of the melodic chimes created by the contact of the chime members. In this way, the audio and visual effects created by the chime members 18 are coordinated to enhance the effect of the fixture.

The light source 16 shown in the drawings comprises a bulb holder 40 which carries a bayonet-style bulb 42. Holder 40 is carried by the upper wall portion of the inner housing 14 by means of a mounting bracket 44. It is to be understood, however, that numerous other configurations and forms of electrically activated light sources could be employed in the present invention.

Various other changes and modifications may be made in carrying out the present invention without departing from the spirit and scope thereof. Insofar as they changes and modifications are within the purview of the appended claims, they are to be considered as part of the present invention.

I claim:

1. A light fixture adapted to be mounted on an outdoor ceiling support for providing coordinated visual and audio effects, said fixture comprising: a first housing adapted to be carried by the ceiling support; a light source mounted in said housing for directing light downwardly therefrom and illuminating an area below said housing; and a plurality of depending chime members disposed in a laterally spaced array within said area below said light source such that upon such light source being activated, said chime members cooperate with said source to provide decorative shadows therebelow and upon said chime members being moved into contact with one another, said shadows are caused to move at a rate corresponding to the tempo of the audio effects created by the contacting chime members.

2. The light fixture of claim 1 wherein the chime members are defined by a corresponding plurality of tubular elements to allow for the passage of light therethrough.

3. The light fixture of claim 1 including a decorative outer housing disposed about and extending below said first housing so as to conceal at least a portion of said first housing and said light source.

4. The light fixture of claim 1 including at least one cord extending between said chime members and said first housing for suspending said chime members from said housing in a laterally spaced disposition and including a decorative housing disposed about and extending below said first housing so as to conceal a portion of said cord member.

5. A light fixture adapted to be mounted on an outdoor ceiling support for providing coordinated visual and audio effects: said fixture comprising a first housing adapted to be carried by the ceiling support; a light source mounted in said first housing for directing a light downwardly therefrom and illuminating an area below said housing; a plurality of tubular chime members depending from said housing in a laterally spaced array within said area below said light source; and a decorative housing disposed about and extending below said first housing whereby upon said light source being activated and said chime members being moved into contact with one another by a breeze, a decorative moving shadow pattern is formed below said fixture, said pattern moving at a rate corresponding to the tempo of the audio effects created by the contacting chime members.

* * * * *